March 25, 1924.                                              1,488,118
C. HILL ET AL.
HANDLE FOR SPRING INSTRUMENTS
Filed Aug. 23, 1923
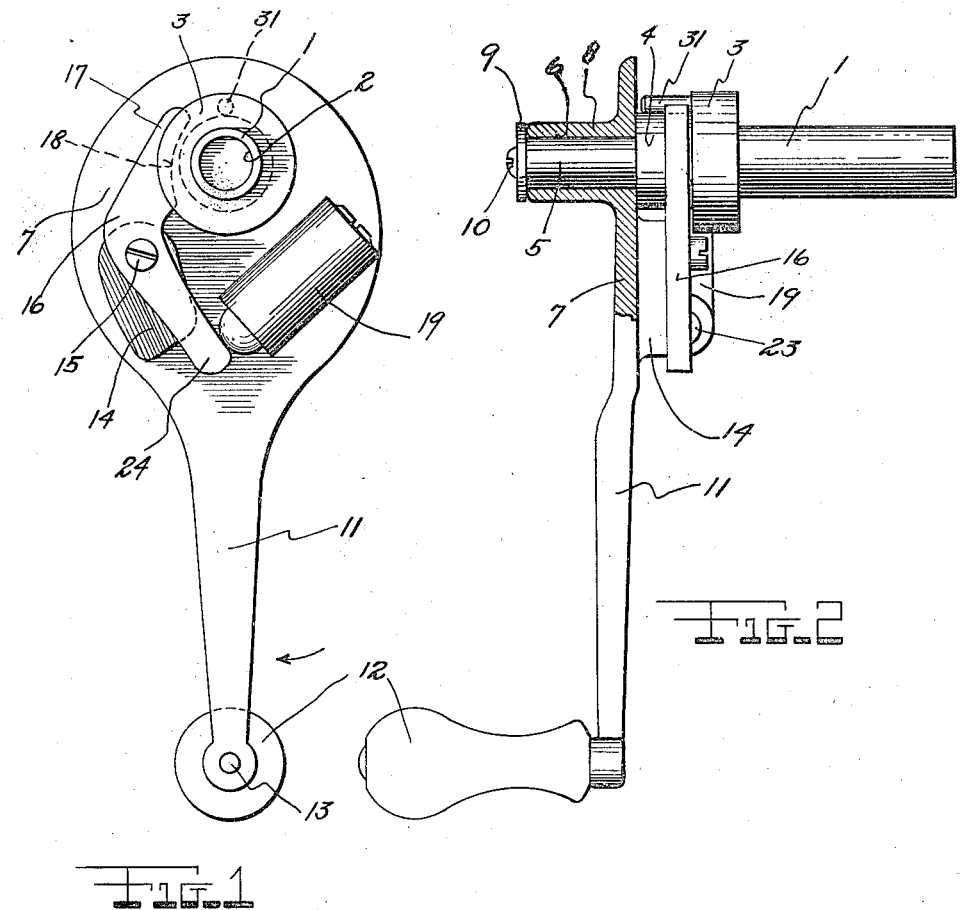
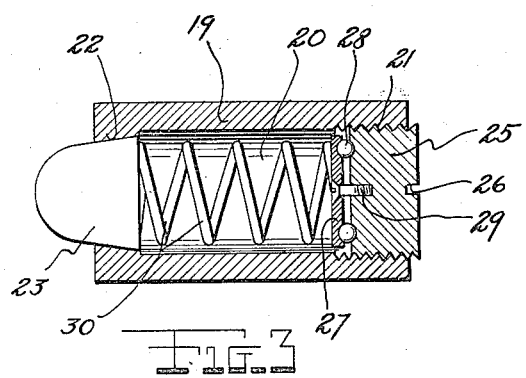
INVENTORS
F. Hill
C. Hill
BY
ATTORNEY Patented Mar. 25, 1924.

1,488,118

UNITED STATES PATENT OFFICE.

CHARLES HILL AND FRED HILL, OF BROOKLYN, NEW YORK.

HANDLE FOR SPRING INSTRUMENTS.

Application filed August 23, 1923. Serial No. 658,899.

*To all whom it may concern:*

Be it known that we, CHARLES HILL and FRED HILL, citizens of the United States, residing at Brooklyn, in the county of Kings and State of New York, have invented certain new and useful Improvements in Handles for Spring Instruments, of which the following is a specification.

The main object of this invention is to provide a crank handle particularly useful for winding spring-operated mechanisms such as phonograph motors, and is provided with means for preventing an excessive winding of the mechanism spring.

Another object is to provide a crank handle for the purpose mentioned, having an escapement device thereon which permits the user to wind a spring operated mechanism without danger of dislocating the spring being wound, as the escapement device begins to operate when the spring has been fully tensed.

These and other objects will become apparent in the description below, in which characters of reference refer to like-named parts of the drawing.

Referring briefly to the drawing, Figure 1 is a bottom plan view of the crank handle.

Figure 2 is a fragmentary sectioned side elevational view of the same.

Figure 3 is an enlarged sectional elevational view of a portion of the device.

Referring in detail to the drawing, the numeral 1 indicates a spindle which may be of any length and is provided with internal threads 2 at one end, said threads being adapted to engage the winding stem of a spring operated mechanism such as a phonograph motor. A flange 3 is fixedly mounted near one end of the spindle and has a sleeve 4 of slightly smaller dimensions fixed adjacent the same and facing the short end of the spindle. A smaller end 5 of the spindle is inserted into an opening 6, the latter being formed in an elliptic plate 7, said plate having a boss 8 thereon thru which the opening 6 passes. A washer 9 secured to the smaller end 5 of the spindle by a screw 10, retains said spindle rotatably in the boss 8. A tapering arm 11 extends from the plate 7 and has a handle 12 at its lower end, said handle being rotatably mounted upon a pin 13. A lug 14 projects from the surface of the plate on the opposite side to the boss 8 and has a threaded hole therein in which a screw 15 is received. Said screw provides a pivot for an angular pawl lever 16, the upper end 17 of said pawl lever having a curved face 18 which lies adjacent to the periphery of the sleeve 4. A substantially semi-circular housing 19 projects from the surface of the plate 7, and is angularly adjacent the lug 14. Said housing is provided with a chamber 20 having internal threads 21 at one end, the opposite end being somewhat restricted by a conical opening 22, the latter having a plunger 23 seated thereon, said plunger having a spherical projecting end which lies in contact with a lower end 24 of the pawl lever 16. The internal threaded end of the housing 19 receives a screw stud 25 provided with a slot 26 for manipulation. An annular race 27 is separated from the screw stud 25 by ball bearings 28, and is rotatably secured to the screw stud by a relatively small screw 29. A spring 30 is retained between the plunger 23 and the outer surface of the race 27, and normally urges the plunger 23 outwardly. A pin 31 projects from one face of the flange, its periphery lying in contact with the periphery of the sleeve 4.

All spring wound mechanisms are usually provided with a winding stem having a threaded end. To this threaded end, the spindle 1 of the crank handle is secured. When the handle 12 is grasped and rotated in the direction indicated by the arrow in Figure 1, the upper end 17 of the pawl lever 16 engages the pin 31, and urges the entire spindle in the same direction, thus causing said spindle to wind the spring of the mechanism. As the mechanism spring becomes fully tensed, danger of snapping or fracturing the spring would result if the operator would not come to an abrupt stop. With this crank handle, however, stopping is not required, as an escapement is provided by means of the pin 31 and pawl lever 16. As the mechanism is fully tensed, the rounded nose of the upper end 17 of the pawl lever 16, slips over the pin 31 at each revolution of the arm 11. As member 16 passes the pin, the plunger 23 contacts with the lower end 24 of member 16 and slightly rotates the same to its original position.

The tension with which the plunger 23 urges the arm 16 into its original position, may be varied by the screw stud 25, which when rotated in either direction, increases or decreases the tension of the spring 30. In order to facilitate rotation of the screw stud, the race 27, which is seated on the ball bearings 28, is provided, thus permitting the screw stud 25 to be rotated without undue friction.

We claim:—

1. A crank handle comprising a spindle, a crank arm freely rotatable on said spindle, a flange rigid on said spindle, a pawl pivoted on said crank arm, a pin extending from said flange and adapted to engage the pawl lever to cause the crank arm and spindle to rotate in unison housing on said crank arm having an internal thread at one end, a screw seat engaging said thread, a plunger normally extending from said housing, and means for urging the plunger outwardly.

2. A crank handle comprising a spindle, a crank arm freely rotatable on said spindle, a flange rigid on said spindle, a pawl lever pivoted on said crank arm, a pin extending from said flange and adapted to engage the pawl lever to cause the crank arm and spindle to rotate in unison, a housing on said crank arm, a plunger mounted in said housing, a spring in said housing urging the plunger outwardly to contact with one end of the pawl lever, said pawl lever when under tension, being adapted to disengage from said pin to permit independent rotation of the spindle, said plunger being adapted to rotate said pawl lever into the original position when past said pin, and means for adjusting the tension of said spring.

3. A crank handle comprising a spindle, a crank arm rotatable on said spindle, a rigid flange on said spindle, a pawl lever pivoted on the crank arm, a pin on said spindle adapted to engage one end of the pawl lever to cause the spindle and crank arm to rotate in unison, a housing on said crank arm adjacent the lower end of the pawl lever, a substantially hemispherical plunger having a converging circular face, the face converging toward the nose of the plunger, the housing having a tapering opening for receiving said plunger therein, a spring behind said plunger normally urging the latter outwardly, a screw stud engaging said housing opposite to the plunger and a ball race supported on said screw stud, the race being adapted to retain the spring stationary while the screw stud is rotated, said screw stud being adapted to vary the tension of said spring when rotated.

In testimony whereof we affix our signatures.

FRED HILL.
CHARLES HILL.